3,252,899
TREATMENT OF WATER UTILIZING
ACTIVATED CARBON
Archie H. Rice and Walter R. Conley, Corvallis, Oreg.,
assignors to General Services Company, Corvallis,
Oreg., a corporation of Oregon
No Drawing. Filed Apr. 1, 1964, Ser. No. 356,654
7 Claims. (Cl. 210—40)

The present invention relates to the purification of water and more particularly to a process for removing organic materials from water.

Organic materials are frequently removed from water by adsorption upon activated carbon. In one process finely divided activated carbon is fed to the entrance of the settling basin together with a coagulant, the carbon settling out in the basin together with the coagulatant so that very little carbon reaches the filter. In fact, it has been preferred to prevent the carbon from reaching the filters since the carbon has tended to clog the same, or in some instances to pass entirely through the filter so as to appear in the effluent.

Organic materials have also been removed from water by passing the water through beds of activated carbon of substantial depth. However, such beds are relatively expensive in the first instance and the life of the granular carbon making up such beds is relatively short and the carbon must be replaced at frequent intervals at substantial cost. Moreover, the carbon beds quickly become fouled unless the water being treated is very clear and free from suspended matter.

It is an object of the present invention to provide a new and improved process for removing organic materials from water.

More particularly, it is an object of the present invention to provide a process by which organic materials can be removed from water at a lower cost than by processes known heretofore. A further object of the invention is to provide a process wherein organic materials can be removed successfully from the water in the presence of substantial amounts of turbidity in the water.

Still another object of the invention is to provide a process for removing organic materials from water that can be carried out in a plant of minimum capital cost. A still further object is to provide a process which may be utilized with a minimum of alteration of existing water treatment plants.

These and other objects of the invention will become more apparent hereinafter.

In accordance with the present invention, water to be clarified is treated with a filter conditioner, and with a coagulant if desired, and substantially at the same time finely divided activated carbon added to the water and the water substantially immediately and without settling passed through a separation bed having a substantial depth and made up of particles of graduated size, the particles being arranged so that the filter flow is in the direction from coarse to fine particles.

In such a bed the carbon penetrates a substantial depth, but is retained in the bed and does not pass therethrough, thus providing a substantial surface upon which the organic materials may be adsorbed.

For the purpose of the present application, the terms used herein are defined as follows:

A coagulant is a material which will cause suspended particles in water to floc or to be altered so they can be removed efficiently by filtration. The particles may be enlarged in size by the coagulant, or they may be adsorbed, or enmeshed in the precipitate formed by the coagulant. Suitable coagulants include aluminum sulphate, ferric sulphate, ferrous sulphate, ferric chloride, copper sulphate and various organic polymers known to the art.

A filter conditioner is a material which will assist in the removal of the coagulated materials from water. The filter conditioner enables the filter or separation bed to remove and retain a larger amount of suspended matter than is possible without the conditioner. Specific materials which are effectice are Separan NP-10, a polyacrylamide made by Dow Chemical Co.; Hagan Coagulant Aid No. 2, a polysaccharide made by Hagan Chemicals and Controls, Inc.; Superfloc, a polyacrylamide made by American Cyanamid Company; and activated silica. Other polyelectrolytes such as acrylamide polymer hydrolytes and polyacrylamides having carboxyl groups substituted for some of the amide groups are also effective.

Separan NP-10 is reported to have a molecular weight of approximately one million and is represented by the formula:

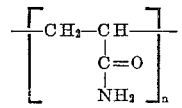

Separan NP-10 is formed by the polymerization of acrylamide. Because of the preponderance of amide groups, the polyacrylamide is essentially nonionic in solution although a small amount of the amide groups are usually hydrolyzed to anionic carboxyl groupings. It is a white, free flowing, amorphous solid with a bulk density of 0.55 gram per cubic centimeter. It softens at 220–230° C. and decomposition is evident at 270° C. It is rapidly wetted by water and is soluble in water in all proportions.

The amount of coagulant necessary will vary depending upon the characteristics of the water being treated and the amount of turbidity which is carried thereby. Within very general limits the coagulant dosage may vary from 5 to 100 parts per million or even greater amounts in the case of very turbid water. The amount of filter conditioner required will normally be less than 0.5 part of filter conditioner per million parts of water by weight. Ordinarily between about 0.01 to 0.3 part per million of a filter conditioner will be sufficient. However, the amount can be determined very readily by adding an excessive amount, that is, by more than 0.5 part per million and decreasing the amount of filter conditioner until carbon begins to appear in the effluent from the separation beds. The filter conditioner is then decreased until the carry through of carbon disappears and this will determine the minimum amount of filter conditioner which is necessary. The filter conditioner preferably is added as an aqueous solution not more than about five minutes prior to the time of passing the water through the separation bed. Longer delay reduces the ability of the filter conditioner to secure retention of the carbon within the separation bed.

The separation beds of the invention may be of the dual media type, that is, comprising a relatively deep layer of coarse particles such as anthracite coal of between about 6 to 20 mesh (U.S. sieve) and a shallower layer of fine materials such as garnet sand of between about —40 to 100 mesh. The anthracite is preferably in a layer of greater than 20 inches in depth and the sand in a layer between 6 to 12 inches in depth. Preferably however, the separation beds comprise media of at least three different specific gravities and sizes such as are more particularly described in our copending application Serial No. 345,204, filed February 17, 1964. Such beds are composed of particulate material having a maximum size of about 10 mm. and a minimum size of about 100 mesh. The particles are arranged in the bed such that there is a substantially increasing number of particles in the direction of flow through the bed.

As described in the application identified above, the relatively dense material, for example garnet, may comprise between about 8 to 20 percent by weight of the bed and may range between about minus 40 to plus 80 U.S. mesh; the next less dense material, for example, graphite rock, may comprise between about 16 to 20 percent of the weight of the bed and may range between about minus 25 to plus 50 mesh; the least dense material, for example, anthracite, may comprise between about 15 to 75 percent of the bed and may range between about minus 10 to plus 20 mesh.

Such a bed may comprise for example about 20 percent garnet of minus 50 plus 80 U.S. mesh, 30 percent graphite rock of minus 30 plus 50 mesh and 50 percent anthracite coal of minus 10 plus 20 mesh. Such materials are placed in the container and backwashed until a substantial equilibrium is obtained between the relative positions of the particles in the bed. After backwashing the particles are distributed with a maximum number of the large size particles at the top with a continually decreasing number towards the bottom of the bed. The heaviest, smallest sized materials are distributed in the reverse manner whereas the medium density materials are distributed so that a maximum number thereof appear in the center of the bed with a minimum number tailing off both towards the top and the bottom of the bed. Consequently, by count, the particles are distributed in the manner mentioned previously, that is, so that there is a continually increasing number of particles from the top to the bottom of the bed.

The activated carbon utilized herein is preferably very finely divided, the carbon preferably being less than 100 mesh in fineness. The amount to be added will vary depending on the nature and amount of organic material to be removed and may range from about 10 to 150 p.p.m.

Runs are continued until activated carbon begins to show in the effluent or the head loss through the separation bed rises excessively. In either case the separation bed is then backwashed to remove the activated carbon and any other foreign material retained in the bed.

Various aspects of the invention will become more clear from the specific examples of the practice of the invention given below.

*Example I*

Water having an ABS (alkyl benzyl sulfonate) content of about 4 p.p.m. was treated by adding to such water 56 p.p.m. alum and 0.4 Separan together with about 45 parts activated carbon. The treated water was then passed at a flow rate of 5 g.p.m. per square foot through a separation bed comprising 20 percent garnet minus 50 plus 80 mesh U.S. sieve, 30 percent graphite rock of minus 30 plus 50 mesh and 50 percent anthracite of minus 10 plus 20 mesh backwashed to equilibrium as described above. The ABS content of the effluent was reduced to about 0.5 p.p.m. In a control test identical except with the omission of the activated carbon the effluent from the filter contained 1.9 p.p.m. ABS.

*Example II*

Water from the supply of a suburb of Denver, Colorado, was treated by adding 20 p.p.m. alum, 0.02 p.p.m. Separan and 50 p.p.m. activated carbon of minus 100 mesh thereto and the water passed through a separation bed. Such bed was 30 inches deep and comprised 50 percent by weight anthracite coal of minus 10 plus 20 U.S. sieve mesh, 16 percent graphite rock minus 20 plus 50 mesh, 26 percent silica sand minus 20 plus 60 mesh and 8 percent garnet of minus 40 plus 80 mesh backwashed to equilibrium. With an ABS content of the raw water of 0.8 p.p.m., the effluent ABS was 0.1 p.p.m. The length of the filter run was 8 to 10 hours at 3 gallons per minute after which the filter was backwashed to remove the activated carbon therefrom together with any other materials deposited therein and filtering then recommenced.

On another occasion with the ABS supply content at 1.8 p.p.m., 100 p.p.m. activated carbon was added and under otherwise similar conditions the ABS content reduced to 0.3 p.p.m.

Having illustrated and described a preferred embodiment of the invention, it should be apparent to those skilled in the art that the invention permits of modification in arrangement and details. We claim as our invention all such modifications as come within the true spirit and scope of the following claims.

We claim:

1. The process for removing organic materials from water comprising:
   adding thereto a filter conditioner and finely divided activated carbon,
   and substantially immediately thereafter passing said water without prior settling through a separation bed comprising particles grading from coarse to fine in the direction of flow,
   said particles having a maximum size of about 10 millimeters.

2. The process for removing organic materials from water comprising:
   adding to water containing such materials an inorganic coagulant, a filter conditioner, and finely divided activated carbon,
   and substantially immediately thereafter and without settling passing said water through a separation bed comprising particles grading from coarse to fine in direction of flow,
   said particles having a maximum size of about 10 millimeters.

3. The process of claim 2 wherein said inorganic coagulant is selected from the class consisting of aluminum sulfate, copper sulphate, ferric chloride, ferric sulphate and ferrous sulphate.

4. The process of claim 2 wherein said filter conditioner is selected from the class consisting of polysaccharides, polyacrylamides, acrylamide polymer hydrolytes and polyacrylamides having carboxylic groups substituted for some of the amide groups.

5. The process for removing organic materials from water comprising adding to such water an inorganic coagulant,
   adding a filter conditioner,
   adding activated carbon,
   and passing said water substantially immediately thereafter without prior settling through a separation bed having a depth of between about thirty to sixty inches and comprising particles grading in size from about −10 to +100 U.S. sieve,
   said particles comprising media of at least three different specific gravities, there being present at least five percent by weight of a media of each specific gravity,
   said particles being arranged in said bed to provide a progressively increasing number of particles in the direction of flow through the bed.

6. In a process for purifying water the steps of:
   adding to such water a polyelectrolyte and activated carbon of less than 100 U.S. mesh,
   and substantially immediately thereafter passing said water through a separation bed having a depth of between about thirty to sixty inches and comprising between about 8 to 20 percent of a relatively dense material of between about −40 +80 mesh, between about 16 to 30 percent of a less dense material of between about −20 +50 mesh, and between about 50 to 76 percent of a material of still lower density of between about −10 +20 mesh, said bed being backwashed to equilibrium.

7. The process set forth in claim 6 wherein between about 10 to 150 p.p.m. activated carbon are added.

References Cited by the Examiner

UNITED STATES PATENTS 2,031,711   2/1936   Jaenicke et al. ____ 210—193 X

OTHER REFERENCES

Conley: Experience With Anthracite-Sand Filters, Jour. AWWA, December 1961, vol. 53, pp. 1473–1483.

MORRIS O. WOLK, *Primary Examiner.*

MICHAEL E. ROGERS, *Examiner.*